United States Patent
Lin et al.

(10) Patent No.: US 9,468,051 B1
(45) Date of Patent: Oct. 11, 2016

(54) LIGHT EMITTING DIODE LINEAR LIGHT MODULATOR WITH TEMPERATURE COMPENSATION

(71) Applicant: NATIONAL YUNLIN UNIVERSITY OF SCIENCE AND TECHNOLOGY, Yunlin County (TW)

(72) Inventors: Chun-Wei Lin, Yunlin County (TW); Jia-Si Lee, Yunlin County (TW)

(73) Assignee: NATIONAL YUNLIN UNIVERSITY OF SCIENCE AND TECHNOLOGY, Douliu, Yunlin County (TW)

( * ) Notice: Subject to any disclaimer, the term of this patent is extended or adjusted under 35 U.S.C. 154(b) by 0 days.

(21) Appl. No.: 14/837,422

(22) Filed: Aug. 27, 2015

(51) Int. Cl.
H05B 33/08 (2006.01)
(52) U.S. Cl.
CPC ...... *H05B 33/0815* (2013.01); *H05B 33/0812* (2013.01)
(58) Field of Classification Search
None
See application file for complete search history.

(56) References Cited

U.S. PATENT DOCUMENTS

| 2009/0135866 | A1* | 5/2009 | Nishimura | H01S 5/042 372/34 |
| 2012/0300947 | A1* | 11/2012 | Lin | H03K 7/08 381/55 |
| 2013/0076250 | A1* | 3/2013 | Logiudice | H05B 33/086 315/161 |

FOREIGN PATENT DOCUMENTS

EP 1814365 8/2007

* cited by examiner

*Primary Examiner* — Dedei K Hammond
(74) *Attorney, Agent, or Firm* — Muncy, Geissler, Olds & Lowe, P.C.

(57) ABSTRACT

A light emitting diode (LED) linear light modulator with temperature compensation includes a comparing module, a timing processing module, an LED module and a temperature compensating current control module. The comparing module compares an analog input signal with a triangular wave sampling signal to generate a pulse width modulation (PWM) signal. The PWM signal is inputted into the timing processing module and converted to a digital signal. The temperature compensating current control module, electrically connected to the LED module and the timing processing module, includes a plurality of low-temperature correlated linear current units and a switching switch, and controls a current amount passing through the LED module to generate a low-temperature correlated linear current. Thus, the color temperature of an LED is prevented from drifting with a change in the ambient temperature.

7 Claims, 7 Drawing Sheets

LIGHT EMITTING DIODE LINEAR LIGHT MODULATOR WITH TEMPERATURE COMPENSATION

FIELD OF THE INVENTION

The present invention relates to a light emitting diode (LED) light modulator, and particularly to an LED linear light modulator with temperature compensation.

BACKGROUND OF THE INVENTION

Diversified light sources, e.g., incandescent light bulbs, fluorescent lamps and light emitting diodes (LEDs), are commonly present in people's daily lives. LEDs, featuring advantages of high efficiency, a long life cycle, resistance to damages, a fast response speed and high reliability superior to that of conventional light sources, are extensively applied in various fields.

Light modulation of LEDs are mainly categorized into linear modulation and pulse width modulation. For example, the European Patent Publication No. EP 1814365 discloses "LED driving device with pulse width modulation". The above disclosure includes a pulse width modulation (PWM) control unit and an LED driving circuit. The light emitting duration in a PWM period of the PWM control unit is mainly divided into a primary light emitting period and a secondary light emitting period. The primary light emitting period is further divided into multiple small periods that are then distributed throughout the entire PWM period, so as to increase the number of times and the refresh rate of light emitting and to prevent issues of discontinuous images or glittering.

The above conventional solution solves the issues of discontinuous images and glittering. One principle of pulse width modulation is that, continuous linear light is generated through vision persistence of human eyes, and the issue of glittering may remain undiscovered to the human eyes by increasing the refresh rate. However, fundamentally speaking, switching switches at a fast speed causes a large instantaneous current to flow into the LED to potentially shorten the life cycle of the LED. Further, as the ambient temperature changes, semiconductor components in a circuit change the value of an inputted current, and the color temperature of the LED is caused to drift. Therefore, it is a goal of the industrialists of the field to provide a solution that prevents the color temperature of the LED from drifting with a change in the ambient temperature.

SUMMARY OF THE INVENTION

It is a primary object of the present invention to solve the issue that the color temperature of a light emitting diode (LED) drifting with a change in the ambient temperature.

It is a secondary object of the present invention to solve the issue of the shortened life cycle of an LED as a result of a large instantaneous current flowing into the LED when a switch switches at a fast speed.

To achieve the above objects, the present invention provides an LED linear light modulator with temperature compensation. The LED linear light modulator with temperature compensation includes a comparing module, a timing processing module, an LED module and a temperature compensating current control module. The comparing module compares an analog input signal with a triangular wave sampling signal to generate a pulse width modulation (PWM) signal. The timing processing module receives the PWM signal and converts the PWM signal to a digital signal. The temperature compensating current control module, electrically connected to the LED module and the timing processing module, includes a plurality of low-temperature correlated linear current units connected in parallel, and a switching switch electrically connected to the timing processing module, the LED module and the low-temperature correlated linear current units. Each of the low-temperature correlated linear current units includes a positive temperature correlated linear current portion that increases as the temperature increase, and a negative temperature correlated linear current portion that reduces as the temperature decreases to generate a low-temperature correlated linear current. The timing processing module controls an electrical conduction between the low-temperature correlated linear current units and the LED module by the switching switch to further control the current amount passing through the LED module.

In conclusion, the present invention provides following features.

1. By providing the low-temperature correlated linear current units, a low-temperature correlated linear current with extremely low temperature correlation is generated, so that the LED does not drift with a change in the ambient temperature.

2. Through controlling the switching switch by the timing processing module, the current amount passing through the LED is controlled to increase the life cycle of the LED module.

DETAILED DESCRIPTION OF THE PREFERRED EMBODIMENTS

Detailed description and technical contents of the present invention are given with accompanying drawings below.

Figure 1:
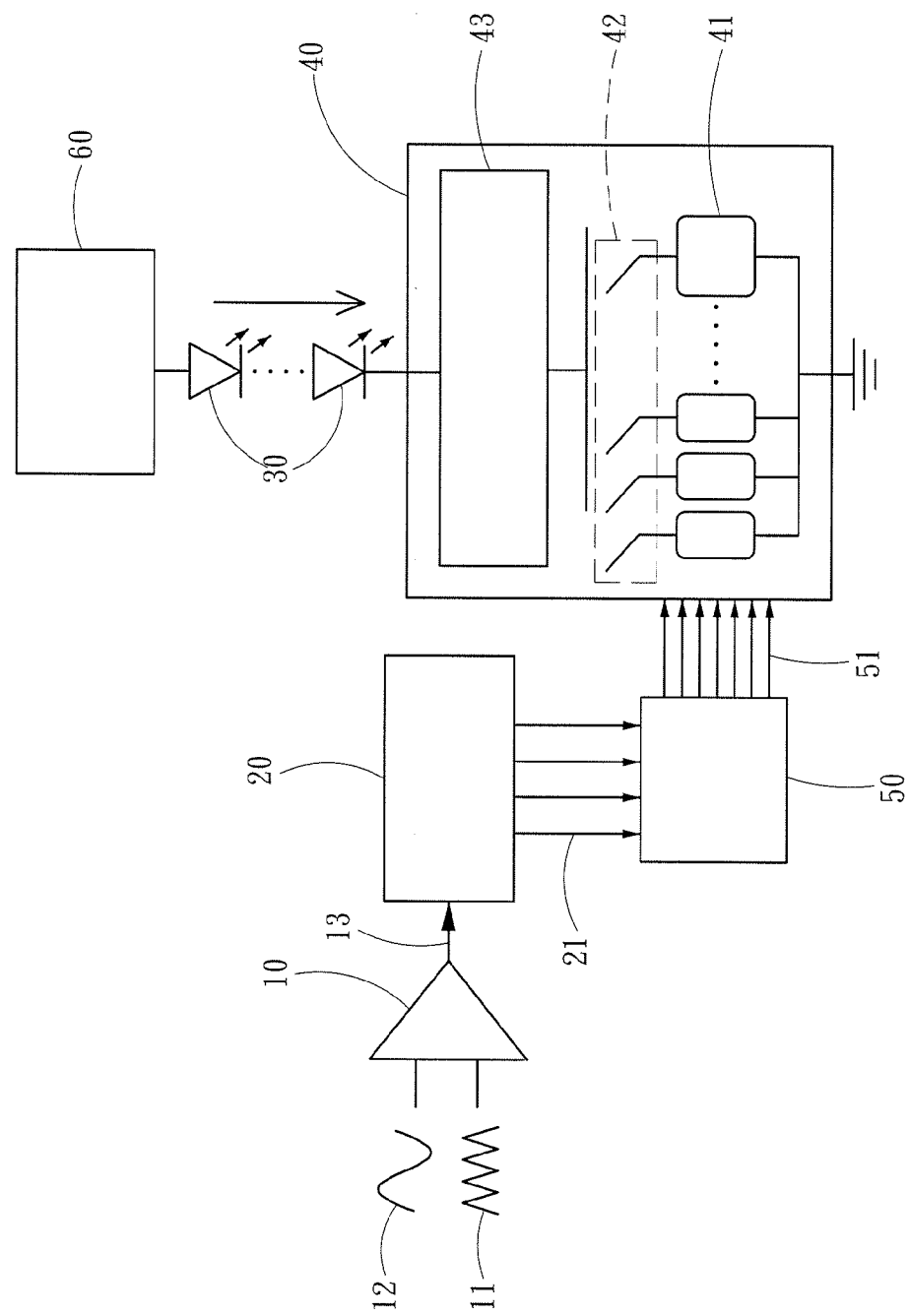
FIG. 1 is a schematic diagram of unit configuration according to a preferred embodiments of the present invention.
Figure 2:
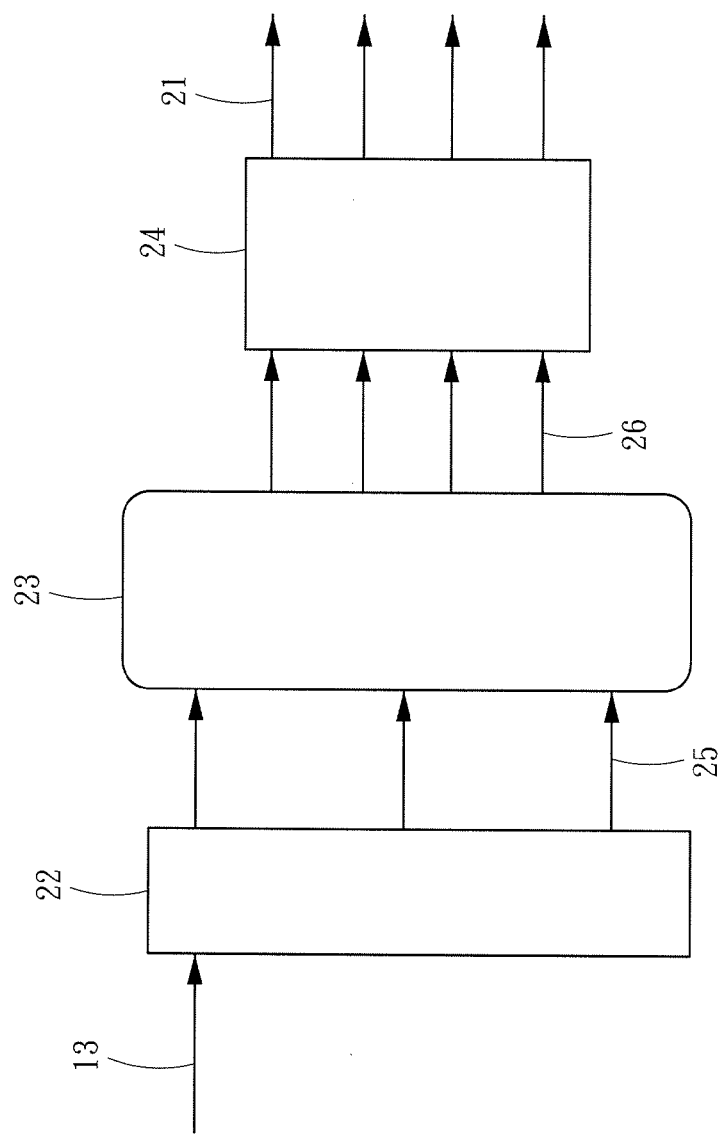
FIG. 2 is a block diagram of a timing processing module according to a preferred embodiments of the present invention.

Referring to FIG. 1 and FIG. 2, a light emitting diode (LED) linear light modulator provided by the present invention includes a comparing module 10, a timing processing module 20, a digital low-pass filter (LPF) module 50, an LED module 30, an independent voltage supply 60 and a temperature compensating current control module 40. The comparing module 10 compares an analog input signal 12 with a triangular wave sampling signal 11 to generate a pulse width modulation (PWM) signal 13. The PWM signal 13 is inputted into the timing processing module 20. The timing processing module 20 includes a delayer unit 22, an adding unit 23 and a latch unit 24. The PWM signal 13 passes through and is delayed by the delayer unit 22 to generate a plurality of timing signals 25. The adding unit 23 adds the timing signals 25 to generate a plurality of timing added signals 26, which are then synchronized by the latch unit 24 to form and output a digital signal 21.

The independent voltage supply 60 provides a voltage that the LED module 30 requires. The digital LPF module 50, electrically connected between the timing processing module 20 and the temperature compensating current control module 40, receives and converts the digital signal 21 having a smaller bit count to a digital signal 51 having a larger bit count, and outputs the digital signal 51 to the temperature compensating current control module 40. The temperature compensating current control module 40 includes a plurality of low-temperature correlated linear current units 41 connected in parallel and a switching switch 42. The switching switch 42 is electrically connected to the digital LPF module 50, the LED module 30 and the low-temperature correlated linear current units 41. The bit count of the digital signal 51 corresponds to the quantity of the low-temperature correlated linear current units 41. Further, by controlling an electrical conduction between the low-temperature correlated linear current units 41 and the LED module 30, the current amount passing through the LED module 30 is further controlled.

In the embodiment, the temperature compensating current control module 40 further includes a voltage buffer unit 43 connected between the LED module 30 and the switching switch 42. The voltage buffer unit 43 stabilizes the voltage the independent voltage supply 60 provides to allow the switching switch 42 to be operable, so as to further control the electrical conduction between the LED module 30 and the low-temperature correlated linear current units 41.

Figure 3:
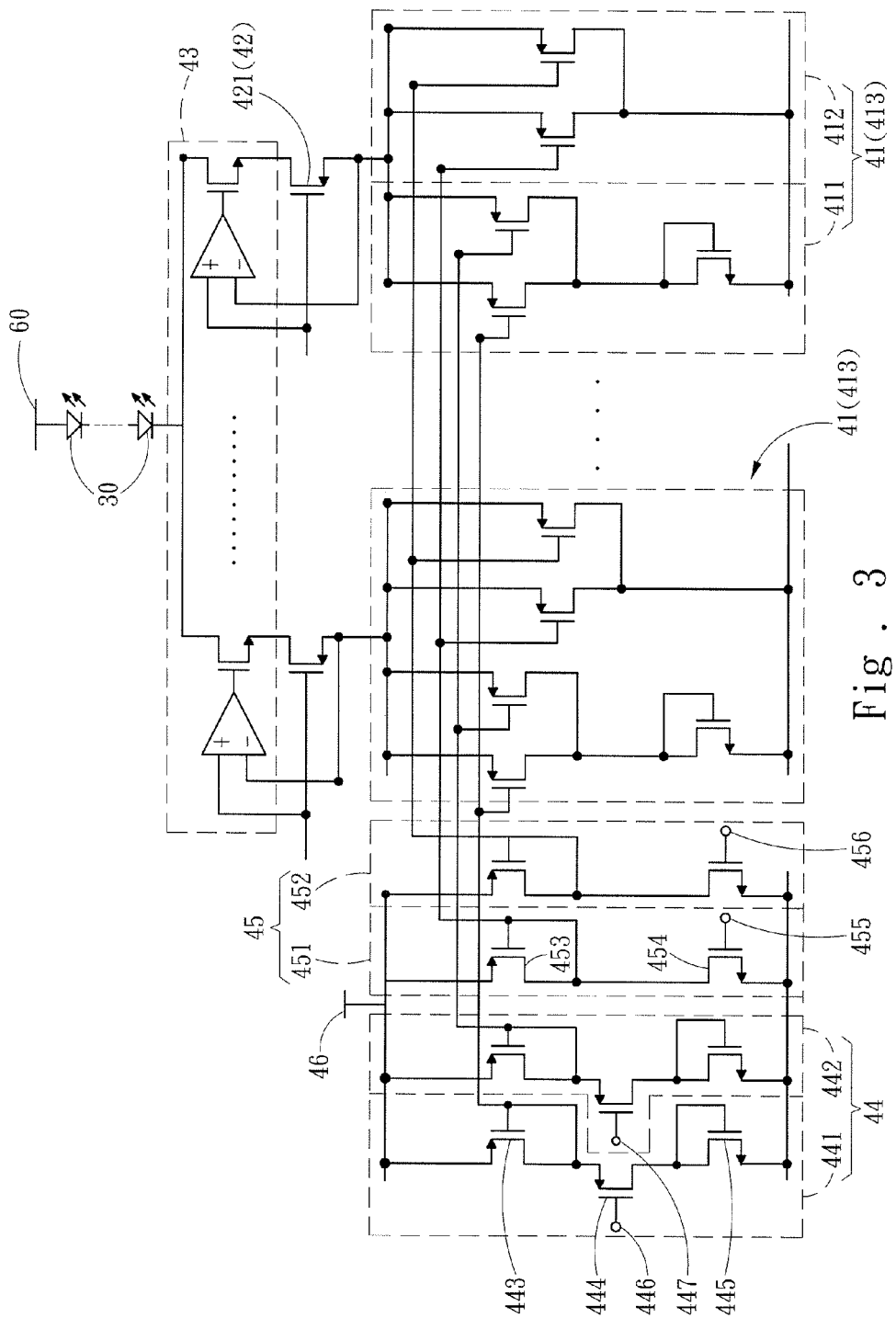
FIG. 3 is a circuit diagram of a temperature compensating current control module according to a preferred embodiments of the present invention.

Referring to FIG. 3, the temperature compensating current control module 40 further includes a positive temperature correlated current generating unit 44 and a negative temperature correlated current generating unit 45. The positive temperature correlated current generating unit 44 includes a first positive temperature correlated current generating portion 441 and a second positive temperature correlated current generating portion 442. The first positive temperature correlated current generating portion 441 and the second positive temperature correlated current generating portion 442 are connected in parallel, and are electrically connected to a voltage supply 46. Each of the first positive temperature correlated current generating portion 441 and the second positive temperature correlated current generating portion 442 includes a first P-type transistor 443, a second P-type transistor 444 and a first N-type transistor 445. The first P-type transistor 443 has its source electrically connected to the voltage supply 46, and its drain electrically connected to the source of the second P-type transistor 444 and the gate of the first P-type transistor 443. The second P-type transistor 444 has its drain electrically connected to the drain and the gate of the first N-type transistor 445. The first N-type transistor 445 has its source grounded. The gate of the second P-type transistor 444 of the first positive temperature correlated current generating portion 441 is electrically connected to a first voltage input end 446. The gate of the second P-type transistor 444 of the second positive temperature correlated current generating portion 442 is electrically connected to a second voltage input end 447.

The negative temperature correlated current generating unit 45 includes a first negative temperature correlated current generating portion 451 and a second negative temperature correlated current generating portion 452. The first negative temperature correlated current generating portion 451 and the second negative temperature correlated current generating portion 452 are connected in parallel, and are electrically connected to the voltage supply 46. Each of the first negative temperature correlated current generating portion 451 and the second negative temperature correlated current generating portion 452 includes a third P-type transistor 453 and a second N-type transistor 454. The third P-type transistor 453 has its source electrically connected to the voltage supply 46, and its drain electrically connected to the drain of the second N-type transistor 454 and the gate of the third P-type transistor 453. The second N-type transistor 454 has its source grounded. The gate of the second N-type transistor 454 of the first negative temperature correlated current generating portion 451 is electrically connected to a third voltage input end 455. The gate of the second N-type transistor 454 of the second negative temperature correlated current generating portion 452 is electrically connected to a fourth voltage input end 456.

Figure 4A:
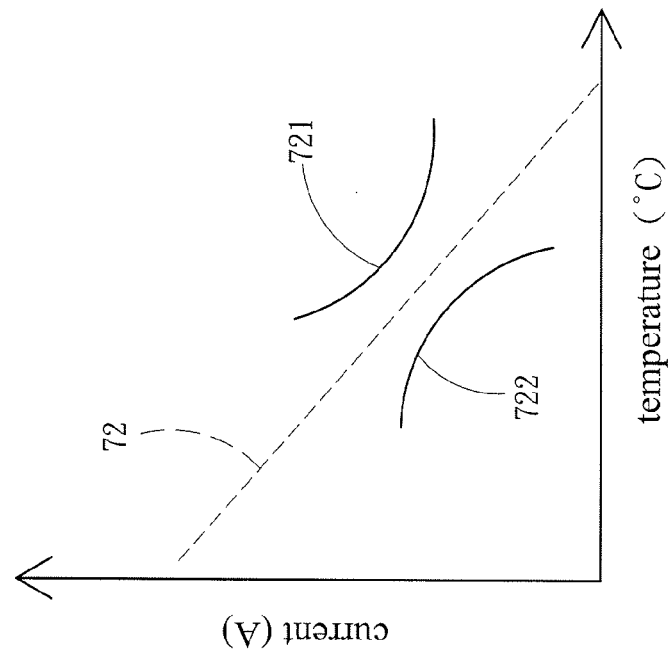
FIG. 4A is a schematic diagram of a positive temperature correlated linear current of the present invention.
Figure 4B:
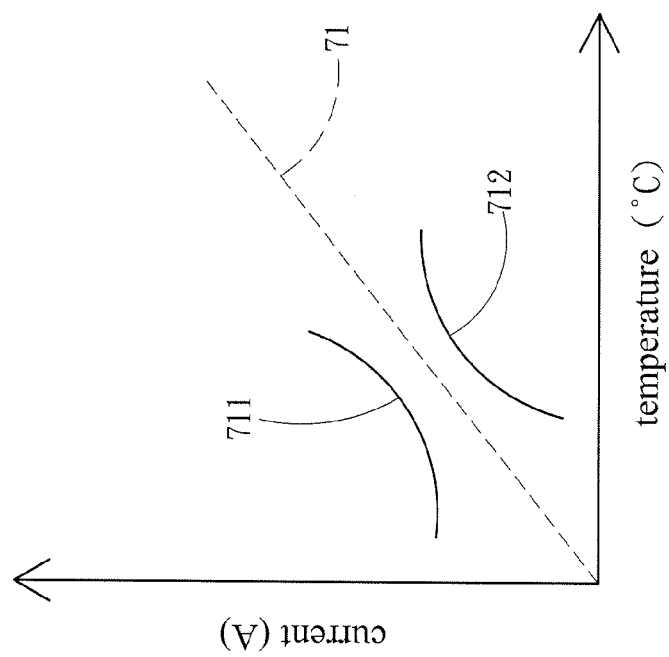
FIG. 4B is a schematic diagram of a negative temperature correlated linear current of the present invention.
Figure 4C:
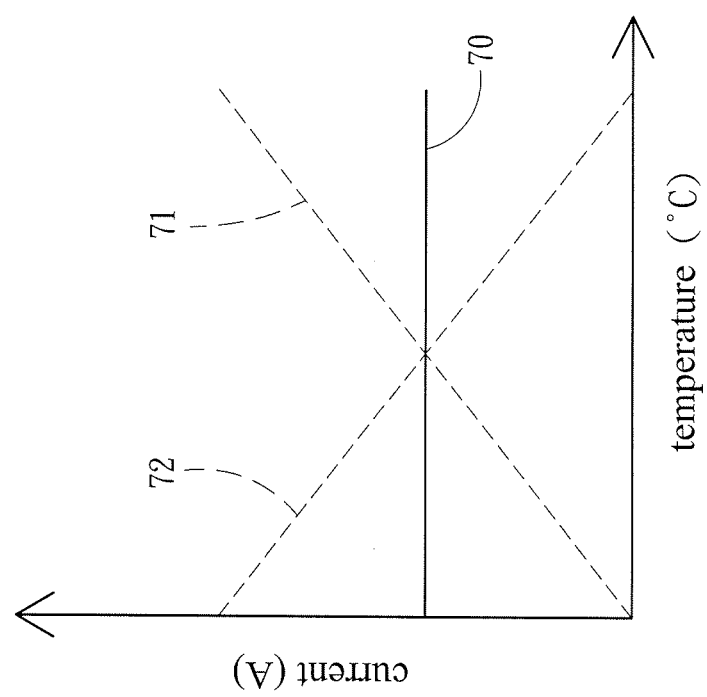
FIG. 4C is a schematic diagram of a low-temperature correlated linear current of the present invention.

Referring to FIG. 4A to FIG. 4C, through controlling the voltages inputted at the first voltage input end 446 and the second voltage input end 447, when the gate-source voltage (Vgs) is greater than a predetermined threshold, the first positive temperature correlated current generating portion 441 generates a first positive non-linear current 711; when the gate-source voltage (Vgs) is smaller than the predetermined threshold, the second positive temperature correlated current generating portion 442 generates a second positive non-linear current 712. By complementing the first positive non-linear current 711 and the second positive non-linear current 712, a positive temperature correlated linear current 71 is formed. Similarly, through controlling the voltages inputted at the third voltage input end 455 and the fourth voltage input end 456, when the gate-source voltage (Vgs) is greater than a predetermined threshold, the first negative temperature correlated current generating portion 451 generates a first negative non-linear current 721; when the gate-source voltage (Vgs) is smaller than the predetermined threshold, the second negative temperature correlated current generating portion 452 generates a second negative non-linear current 722. By complementing the first negative non-linear current 721 and the second negative non-linear current 722, a negative temperature correlated linear current 72 is formed. Then, by complementing the positive temperature correlated linear current 71 and the negative temperature correlated linear current 72, a low-temperature correlated linear current 70 is formed, such that the conduction current of the LED module 30 does not drift with the change in the ambient temperature.

Figure 5A:
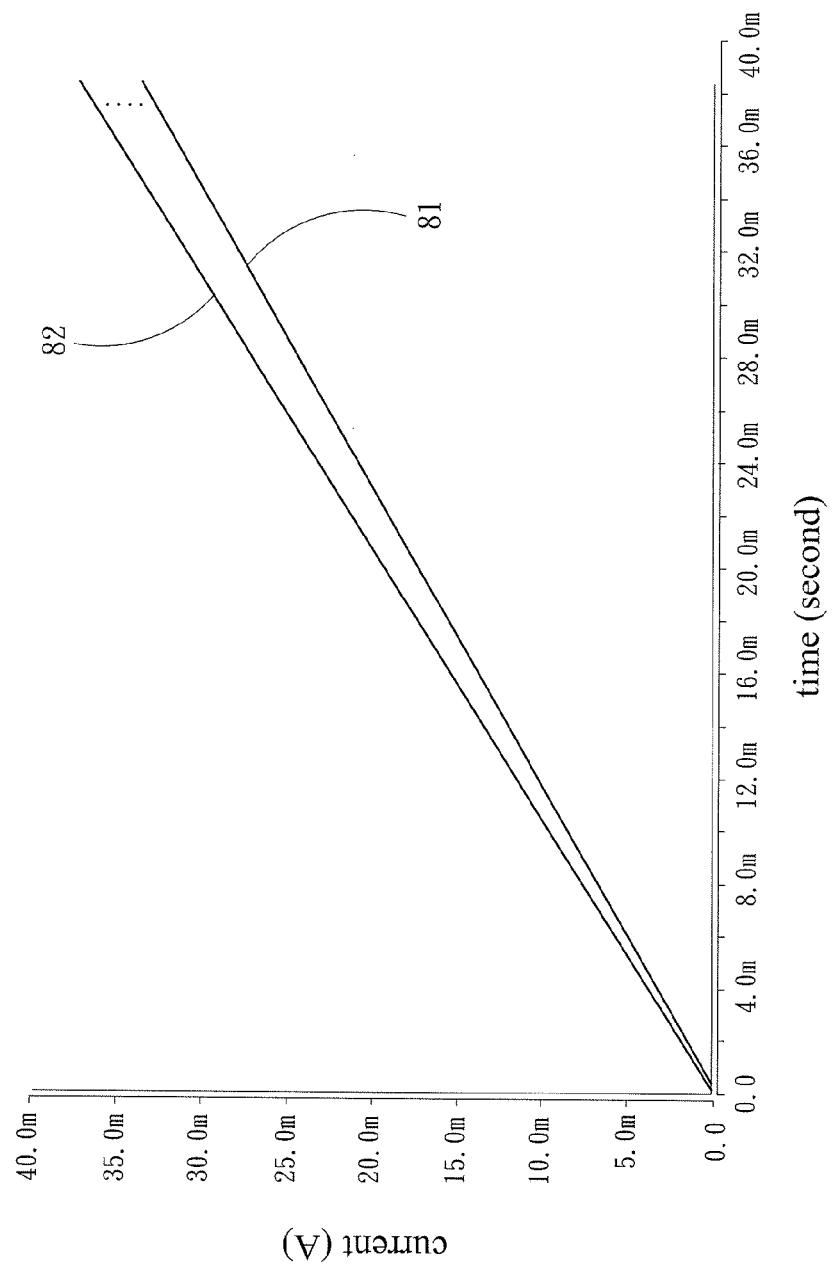
FIG. 5A is a diagram of experimental data without a temperature compensating current control module of the present invention.
Figure 5B:
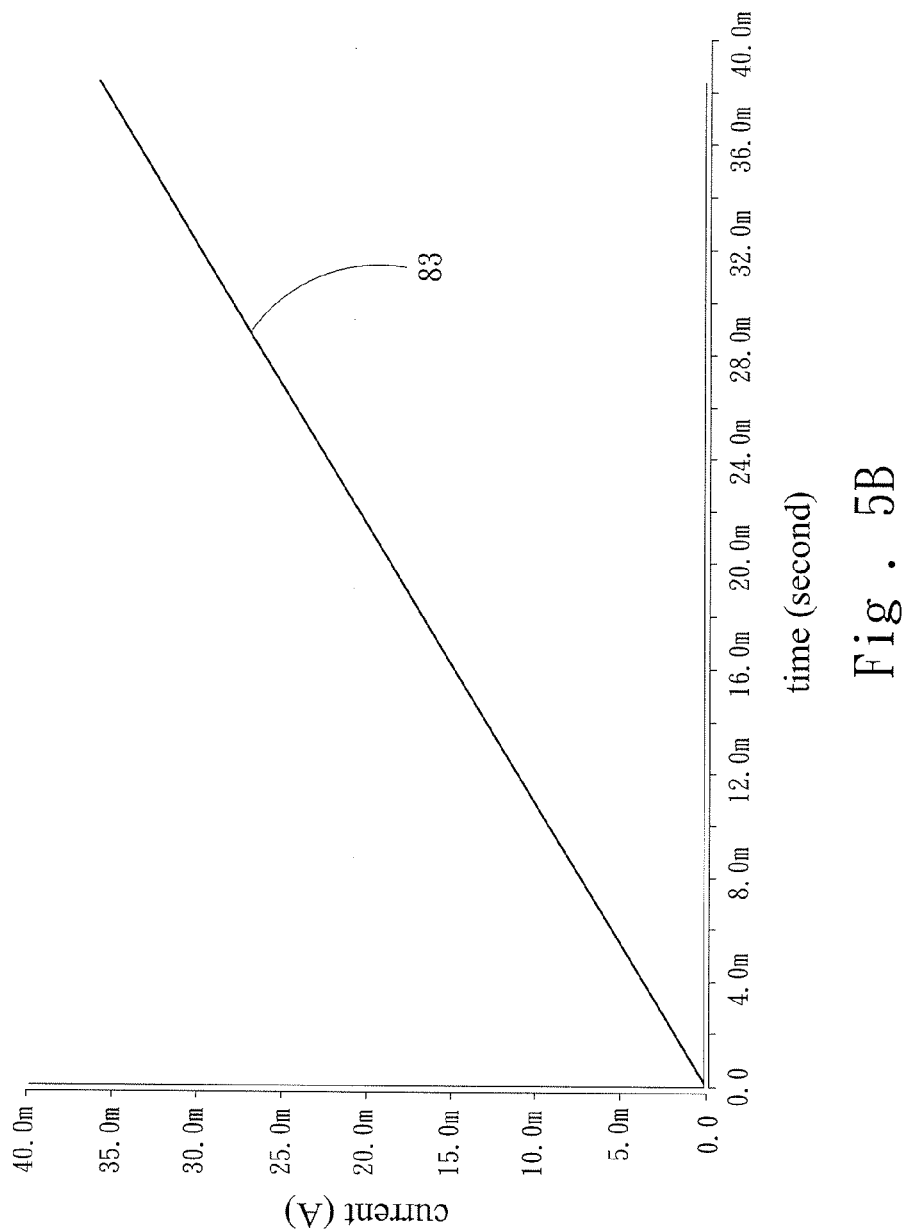
FIG. 5B is a diagram of experimental data with a temperature compensating current control module of the present invention.

FIG. 5A and FIG. 5B are diagrams of experimental data of the present invention. The vertical axis is a current amount passing through, and the horizontal axis is the time of light modulation. The experiments are carried out at a temperature between −20° C. and 120° C. In FIG. 5A, experiments are carried out in an environment without the temperature compensating current control module 40; a −20° C. temperature non-compensated segment 81 is obtained in a environment of −20° C., and a 120° C. temperature non-compensated segment 82 is obtained in a temperature of 120° C. It is known from the above that, the temperature does affect the current amount, in a way that the color temperature of the LED module 30 is caused to drift. In FIG. 5B, experiments are carried out in an environment with the temperature compensating current control module 40; results obtained at a temperature between −20° C. and 120° C. are almost overlapping, and are represented by a temperature compensated segment 83.

Further, each of the low-temperature correlated linear current units 41 may include at least two current mirrors 413. The at least two current mirrors 413 are consisted of a positive temperature correlated linear current portion 411 that generates a current directly proportional to the temperature and a negative temperature correlated linear current portion 412 that generates a current inversely proportional to the temperature, and mirror the currents of the positive temperature correlated current generating unit 44 and the negative temperature correlated current generating unit 45. The switching switch 42 includes a plurality of N-type switch transistors 421 respectively correspondingly connected to the low-temperature correlated linear current units 41. The N-type switch transistors 421 have their gates connected to the digital LPF module 50, and their drains connected to the voltage buffer unit 43 and then to the LED module 30. The voltage buffer unit 43 stabilizes the voltage the independent voltage supply 60 provides. The N-type switch transistors 421 further have their sources respectively correspondingly connected to the low-temperature correlated linear current units 41. The digital signal 51 controls the N-type switch transistors 421, so as to control the electrical conduction between the LED module 30 and the low-temperature correlated linear current units 41.

It should be noted that, the current amounts in the low-temperature correlated linear current units 41 may be different. Taking the embodiment for example, through adjusting the N-type switch transistors 421, the current amounts in the low-temperature correlated linear current units 41 may be adjusted to gradually increase in an order from 1, 21, 22, 23 . . . , so as to control the current amounts in the low-temperature correlated linear current units 41. As such, the LED is allowed to receive a linear current to further adjust the illumination brightness that the LED outputs. For example, when a five-fold current amount needs to be outputted, the digital signal 51 of the digital LPF module 50 is caused to output 0-0-0-0-0-1-0-1 to control the switching switch 42 to conduct one-fold current and four-fold current low-temperature correlated linear current units 41 and to obtain the required five-fold current after adding. The above approach is different from the prior art, in which conventional pulse width modulation is switched and controlled from the time aspect using a minimum current and a maximum current. Therefore, the present invention increases the life cycle of the LED module 30.

In conclusion, the present invention provides following features.

1. Through generating the positive temperature correlated linear current by the positive temperature correlated current generating unit and the negative temperature correlated linear current by the negative temperature correlated current generating unit, and then forming a low-temperature correlated linear current by complementing the positive temperature correlated linear current and the negative temperature correlated linear current, the LED module is prevented from drifting with a change in the ambient temperature.

2. By providing different current amounts in the low-temperature correlated linear current units, i.e., increasing the current amounts in an order from 1, 21, 22, 23 . . . , and controlling the electrical conduction between the LED module and the low-temperature correlated linear current units by the N-type switch transistors, the LED can be accurately linearly adjusted.

3. Through the different current amounts in the low-temperature correlated linear current units, the current amounts are not switched between the minimum current and the maximum current when the N-type switch transistors are switched, hence increasing the life cycle of the LED module.

What is claimed is:

1. A light emitting diode (LED) linear light modulator with temperature compensation, comprising:
   a comparing module, comparing an analog input signal with a triangular wave sampling signal to generate a pulse width modulation (PWM) signal;
   a timing processing module, receiving the PWM signal and converting the PWM signal to a digital signal;
   an LED module; and
   a temperature compensating current control module, electrically connected to the LED module and the timing processing module, comprising:
      a plurality of low-temperature correlated linear current units connected in parallel, each of the low-temperature correlated linear current units comprising a positive temperature correlated linear current portion that increases as a temperature increases and a negative temperature correlated linear current portion that decreases as the temperature reduces to generate a low-temperature correlated linear current; and
      a switching switch, electrically connected to the timing processing module, the LED module and the low-temperature correlated linear current units;
   wherein, the timing processing module controls an electrical conduction between the low-temperature correlated linear current units and the LED module by the switching switch to further control a current amount passing through the LED module.

2. The LED linear light modulator with temperature compensation of claim 1, further comprising:
   a digital low-pass filter (LPF) module, electrically connected between the timing processing module and the temperature compensating current control module, receiving and converting the digital signal having a smaller bit count to a digital signal having a larger bit count, the bit count of the digital signal corresponding to a quantity of the low-temperature correlated linear current units.

3. The LED linear light modulator with temperature compensation of claim 2, wherein the temperature compensating current control module further comprises a voltage buffer unit connected between the LED module and the switching switch; the switching switch comprises a plurality of N-type switch transistors respectively correspondingly connected to the low-temperature correlated linear current units; the N-type switch transistors including gates thereof connected to the digital LPF module, drains thereof connected to the voltage buffer unit, and sources thereof respectively correspondingly connected to the low-temperature correlated linear current units; the digital signal controls the N-type switch transistors to control the electrical conduction between the LED module and the low-temperature correlated linear current units.

4. The LED linear light modulator with temperature compensation of claim 1, wherein the timing processing module further comprises a delay unit, an adding unit and a latch unit; the PWM signal passes though and is delayed by the delay unit to generate a plurality of timing signals, the adding unit adds the timing signals to generate a plurality of timing added signals, and the plurality of timing added signals pass through and are synchronized by the latch unit.

5. The LED linear light modulator with temperature compensation of claim 1, wherein the temperature compensating current control module further comprises a positive temperature correlated current generating unit and a negative temperature correlated current generating unit; each of the low-temperature correlated linear current units comprises at least two current mirrors; the at least two current mirrors are respectively the positive temperature correlated linear current portion and the negative temperature correlated linear current portion, and mirror currents of the positive temperature correlated current generating unit and the negative temperature correlated current generating unit.

6. The LED linear light modulator with temperature compensation of claim 5, wherein the positive temperature correlated current generating unit comprises a first positive temperature correlated current generating portion and a second positive temperature correlated current generating portion; the first positive temperature correlated current generating portion and the second positive temperature correlated current generating portion are connected in parallel and are electrically connected to a voltage supply, and each comprises a first P-type transistor, a second P-type transistor and a first N-type transistor; the first P-type transistor includes a source thereof electrically connected to the voltage supply, and a drain thereof electrically connected to a source of the second P-type transistor and a gate of the first P-type transistor; the second P-type transistor includes a drain thereof electrically connected to a drain and a gate of the first N-type transistor; the first N-type transistor includes a source thereof grounded; the gate of the second P-type transistor of the first positive temperature correlated current generating portion is electrically connected to a first voltage input end, and the gate of the second P-type transistor of the second positive temperature correlated current generating portion is electrically connected to a second voltage input end; through controlling voltages at the first voltage input end and the second voltage input end, the first positive temperature correlated current generating portion and the second positive temperature correlated current generating portion are caused to respectively generate a first positive non-linear current and a second positive non-linear current; the first positive non-linear current and the second positive non-linear current are complemented to form a positive temperature correlated linear current.

7. The LED linear light modulator with temperature compensation of claim 5, wherein the negative temperature correlated current generating unit comprises a first negative temperature correlated current generating portion and a second negative temperature correlated current generating portion; the first negative temperature correlated current generating portion and the second negative temperature correlated current generating portion are connected in parallel and are electrically connected to a voltage supply, and each comprises a third P-type transistor and a second N-type transistor; the third P-type transistor includes a source thereof electrically connected to the voltage supply, and a drain thereof electrically connected to a drain of the second N-type transistor and a gate of the third P-type transistor; the second N-type transistor is grounded; the gate of the second N-type transistor of the first negative temperature correlated current generating portion is electrically connected to a third voltage input end, and the gate of the second N-type transistor of the second negative temperature correlated current generating portion is electrically connected to a fourth voltage input end; through controlling voltages at the third voltage input end and the fourth voltage input end, the first negative temperature correlated current generating portion and the second negative temperature correlated current generating portion are caused to respectively generate a first negative non-linear current and a second negative non-linear current, and the first negative non-linear current and the second negative non-linear current are complemented to form a negative temperature correlated linear current.

* * * * *